United States Patent [19]

Smigerski et al.

[11] Patent Number: 4,788,231

[45] Date of Patent: Nov. 29, 1988

[54] PROCESS FOR PRODUCING POURABLE POWDERED RUBBER CONTAINING FILLER

[75] Inventors: Hans-Jürgen Smigerski, Marl; Uwe Ernst, Borken, both of Fed. Rep. of Germany

[73] Assignee: Hüls Aktiengesellschaft, Marl, Fed. Rep. of Germany

[21] Appl. No.: 177,946

[22] Filed: Apr. 5, 1988

[30] Foreign Application Priority Data

Jul. 14, 1987 [DE] Fed. Rep. of Germany ....... 3723213

[51] Int. Cl.⁴ .................... C08L 21/00; C08K 3/00; C08J 3/16; C08J 3/20
[52] U.S. Cl. .................... 523/334; 524/434; 524/435; 524/436; 524/437; 524/442; 524/548; 524/552; 524/556; 524/565; 524/571; 524/573; 428/402
[58] Field of Search ........ 523/334; 524/571, 434–437, 524/442, 548, 552, 556, 565, 573; 428/402

[56] References Cited

U.S. PATENT DOCUMENTS

| | | | |
|---|---|---|---|
| 3,399,166 | 8/1968 | Burke | 524/243 |
| 3,846,365 | 11/1974 | Berg et al. | 524/525 |
| 3,920,604 | 11/1975 | Berg et al. | 523/333 |
| 3,922,240 | 11/1975 | Berg et al. | 523/334 |
| 3,945,978 | 3/1976 | Berg et al. | 523/334 |
| 3,998,778 | 12/1976 | Berg et al. | 523/334 |
| 4,065,426 | 12/1977 | Yamawaki et al. | 523/334 |
| 4,073,755 | 2/1978 | Berg et al. | 523/334 |
| 4,138,375 | 2/1979 | Berg et al. | 523/334 |
| 4,250,082 | 2/1981 | Sommer et al. | 523/334 |
| 4,375,497 | 3/1983 | Sandstrom | 523/334 |

*Primary Examiner*—Herbert J. Lilling
*Attorney, Agent, or Firm*—Oblon, Fisher, Spivak, McClelland & Maier

[57] ABSTRACT

A process for preparing a pourable powdered rubber containing filler, comprising preparing a blend by mixing a portion of said filler to be incorporated in said rubber product with 0.1 to 6.5 phr of a water-soluble salt of a Group IIa, IIb, IIIa or VIII metal of the Periodic Table and a rubber latex or aqueous emulsion of a rubber solution, adjusting the pH of the blend to a pH ranging from 3.2 to 8.6 by addition of an acid, adding the remaining amount of filler to the pH adjusted blend, separating the rubber containing filler from the aqueous phase of the blend, and drying the powdered rubber product obtained.

13 Claims, No Drawings

PROCESS FOR PRODUCING POURABLE POWDERED RUBBER CONTAINING FILLER

BACKGROUND OF THE INVENTION

1. Field of the Invention:

The present invention relates to a powdered rubber composition.

2. Description of the Background:

In recent years an increasing number of publications have appeared which are concerned with the utilization of powdered rubbers. These publications also show methods of producing the powdered rubbers.

The reason for the increasing widespread interest in powdered rubbers is easily found in the present situation of the state of rubber processing technology. However, the rubber processing techniques presently used all are encumbered by the high costs of time, energy, and personnel. The main reason for these high costs is the state of the rubber raw material which is available in bale form.

The mastication of the rubber bale, and the intimate mixing of the masticated rubber with fillers, mineral oil plasticizers, and vulcanization accelerators are carried out on rollers or in kneaders. To avoid quality reductions, the mixtures are prepared in several steps. The mixture is generally stored between steps. Extruder-pelletizers or extruder-roller dies generally follow the kneaders or rollers.

Only a completely new processing technology can lead the way out of this extremely unsatisfactory and costly technique of rubber processing. For this reason, the use of pourable powdered rubber has been discussed and tested during recent years, because it provides the possibility of being able to process rubber mixtures simply and rapidly, like thermoplastic powders.

Several methods of producing powdered, pourable rubber-filler mixtures, especially rubber-carbon black mixtures based on general-purpose rubbers, have already been found and described such as in German Pat. Nos. 21 35 266 and 24 39 237; German Patent Exposition, No. 22 14 121; German Patent Application Disclosures Nos. 22 60 340, 23 24 009, 23 25 550, 23 32 796, and 26 54 358. An important aspect of the processes described in these disclosures is the use of special surface-active compounds in the preparation of the powdered rubber. Since the main objective of using powdered rubbers, as already stated, is to increase the economy in the area of rubber processing, a basic prerequisite for the success of these efforts is the economical production of rubbers in powdered form.

A process that points in this direction is described and claimed in German Pat. No. 28 22 148. An important drawback of this state of the art process is the fact that not only are powders produced with particles of various sizes, but the powdered particles have a relatively higher content of filler with decreasing particle size. This can result in problems during processing which appear in the form of segregations. The consequences are that the molded parts exhibit variable filler contents as a result of being prepared from the powdered rubbers. This drawback has meanwhile been eliminated by a more recent process modification. However, the process does not solve the problem of controlling the particle size of powdered rubbers. Specifically, the particle size, on the one hand, is very important in the production of the powders (dewatering, drying), and on the other hand, during the processing (oil absorption, pourability, absence of dust). A need has therefore continued to exist for a method of preparing a pourable, powdered rubber of improved properties.

SUMMARY OF THE INVENTION

Accordingly, one object of the present invention is to provide a method of preparing a pourable, powdered rubber which contains a filler and is of a controlled particle size distribution.

Briefly, this objects and other objects of the present invention as hereinafter will become more readily apparent can be attained by a method for preparing a pourable powdered rubber by preparing a blend by mixing a portion of said filler to be incorporated in said rubber product with 0.1 to 6.5 phr of a water-soluble salt of a Group IIa, IIb, IIIa or VIII metal of the Periodic Table and a rubber latex or aqueous emulsion of a rubber solution, adjusting the pH of the blend to a pH ranging from 3.2 to 8.6 by addition of an acid, adding the remaining amount of filler to the pH adjusted blend, separating the rubber containing filler from the aqueous phase of the blend, and drying the powdered rubber product obtained.

DESCRIPTION OF THE PREFERRED EMBODIMENTS

The condition of a filler content independent of particle size is considered to be fulfilled when the deviation from the average amounts to less than 3 phr with filler ratios $\leq 100$ phr. With filler ratios $> 100$ phr, the deviations are correspondingly higher, for example, up to 6 phr with a filler ratio of 200 phr.

Suitable rubber lattices which can be used in the present invention include those based on natural rubber and degraded natural rubber as shown in British Pat. No. 749 955 and German Patent Application No. P 36 06 745.8. Other rubbers include homopolymers and copolymers of conjugated dienes such as those that are prepared by known processes by radical polymerization using an emulsifier as described in, for example, Houben-Weyl, Methods of Organic Chemistry, Volume XIV/I (1961), "Preparation of Rubbers", pages 712 ff.; Ullmann's Encyclopedia of Industrial Chemistry, Volume 9 (1957), pages 325 to 339, and German Patents 679 587, 873 747, and 11 30 597. Suitable conjugated dienes include 1,3-butadiene, isoprene, piperylene, 2-chloro-1,3-butadiene, 2,3-dichloro-1,3-butadiene, and 2,3-dimethyl-1,3-butadiene. The copolymers can be prepared either from mixtures of these conjugated dienes or from mixtures of these conjugated dienes with vinyl compounds such as styrene, alpha-methylstyrene, acrylonitrile, acrylic acid, methacrylic acid, and vinylpyridine. A styrene-butadiene latex with a styrene fraction of 15 to 30 wt. % is preferably used in the present process.

The solids content of the lattices is generally 20 to 25 wt. %.

The rubber emulsions employable in the process of the present invention can be prepared from rubber solutions by known processes in the art, for example, see Houben-Weyl, Methods of Organic Chemistry, Volume I/2 (1961), "Emulsification, Emulsifiers", pages 129 ff.

Suitable rubber solutions are preferably those which are prepared by known processes of the art in the solvent polymerization of synthetic rubbers, for example polybutadienes, polyisoprenes, copolymers of butadiene and styrene, ethylene-propylene copolymers, ethylenepropylene-diene terpolymers, and polyalkenamers that are formed by ring-opening polymerization of cyclic olefins. In the preparation of these rubbers, depending on the monomers employed and the desired properties of the polymers, it is well known that various catalysts which promote olefin polymerization such as Ziegler-Natta, lithium and Alfin catalysts can be employed. Either aliphatic hydrocarbons such as pentane, hexane, heptane, or aromatic hydrocarbons such as benzene or toluene can be used as solvents. Otherwise, the rubber can be brought into solution by dissolving the same in one of these solvents.

The solids content of the rubber solutions generally ranges from 3 to 35 wt. %.

The solids content of the rubber emulsions prepared from the rubber solutions generally ranges from 5 to 30 wt. %.

Powdered rubbers containing filler that contain not only a single rubber, but mixtures of two or more different rubbers, can also be produced by the process of the invention. Rubber lattices, rubber solutions, or aqueous emulsions of the rubber solutions are mixed for this purpose, and processed by the invention to obtain powdered rubbers containing filler. Rubber lattices are preferably used in the present process.

Fillers which can be used in the present invention include the carbon blacks of all activity grades that are customarily used in the rubber industry, such as SAF, ISAF, or HAF carbon blacks including their modifications FEF, GPF, APF, SRF, and MT carbon blacks. However, inorganic substances can also be incorporated such as high-activity silica, kaolin, and slate flour, for example.

The amount of filler to be used ranges from 20 to 1000 parts by weight per 100 parts by weight of rubber (phr), preferably 40 to 250 parts by weight per 100 parts by weight of rubber.

Combinations of carbon black with light-colored fillers are possible.

If the filler is used in the form of a suspension, it is generally prepared by slurrying the filler or fillers in water and then dispersing them in a commercial emulsifying or dispersing apparatus until the individual filler particles have an average particle size diameter of approximately 10 $\mu$m as measured with a Leeds-Northrup laser diffraction spectrometer. When using freshly precipitated silica as filler, the same can also be used directly as the salt-free washed filter cake, and mixed with the rubber component.

The metal salts which can be used in the present process include those of the elements of Groups IIa, IIb, IIIa, and VIII of the Periodic Table of the elements. This group division conforms to the former IUPAC recommendation, see Periodic Table of the Elements, Verlag Chemie, Weinheim, 1985. Suitable metal salts include magnesium chloride, zinc sulfate, aluminum chloride, aluminum sulfate, ferric chloride, ferric sulfate, cobalt nitrate, and nickel sulfate, with the salts of aluminum being preferred. Aluminum sulfate is particularly preferred.

The salts are used in an amount of 0.1 to 6.5 parts by weight per 100 parts by weight of rubber.

Suitable acids for use in the present invention, which adjust the pH of the rubber, include primarily mineral acids such as sulfuric acid, phosphoric acid, and hydrochloric acid, with sulfuric acid being especially preferred. However, carboxylic acids such as formic acid and acetic acid, can also be used.

The amount of acid employed is governed by the nature and quantity of the water-soluble metallic salt, of the filler, of the rubber, and optionally of the alkali metal silicate. It can be determined readily by some preliminary experiments. According to a preferred embodiment of the present process, up to 5 parts by weight of silica ($SiO_2$) per 100 parts by weight of rubber is also used additionally, in the form of an alkali metal silicate solution, preferably as water glass with an $Na_2O:SiO_2$ molar ratio of 2:1 to 1:4. The alkali metal silicate solution can be added either to the rubber component or to the filler suspension. Addition to the rubber component is preferred, especially in a continuous mode of operation.

The present process is generally carried out as follows: First, a filler suspension is prepared by dispersing in water, a portion, preferably $\geq 50\%$, especially preferably $\geq 50$ to 95%, of the filler incorporated in the end product, together with the metal salt and optionally the alkali metal silicate solution. The total amount of water used is governed by the nature of the filler and the degree of solubilization. In general, the components of the filler insoluble in water are approximately 6 wt. %. This value does not represent any binding limitation and can be either smaller or larger. The maximum content is limited by the pumpability of the suspension.

The filler suspension prepared in this way is then mixed intimately with the rubber latex, optionally containing alkali metal silicate solution, or the aqueous emulsion of a rubber solution, optionally containing alkali metal silicate solution. Well-known mixing devices such as propeller mixers are suitable for this purpose. After mixing, the pH is adjusted to within the range of 3.2 to 8.6 using an acid while mixing. A primary rubber grain with a constant filler content is produced here. The size of this primary grain is controlled by the chosen amount of metal salt in the range of 0.1 to 6.5 phr. The control occurs with the coarsest grain size being obtained with the smallest amount of metal salt.

In a last precipitation step, the previously withheld amount of filler, i.e., $\leq 50\%$ of the total amount of filler is incorporated within the primary rubber grains by application with an aqueous suspension. The stirring speed is beneficially lowered during this process step.

It is desirable for the processing of precipitation suspensions with filler contents $\geq 100$ phr, to decrease the pH to 2.5 before the phase separation. An acid from the group of acids mentioned previously is preferably used for this purpose.

The process of the present invention can be carried out either continuously or discontinuously.

If the preparation of the primary rubber grain is carried out discontinuously, for example, in a vessel with stirrer, the rubber component (a), optionally containing alkali metal silicate solution, is added with stirring to the filler suspension (b) containing precipitant and optionally alkali metal silicate solution, which contains only a portion of the filler present in the end product, as mentioned above. The pH, critical to the process, is then adjusted first by adding the acid (c), and the remaining filler is then admixed in the form of an aqueous suspension (d).

In the continuous mode of operation, for example in a tube, the streams (a) and (b) are simultaneously introduced for mixing, and then the streams (c) and (d) are introduced separately in succession.

When using rubber lattices, a temperature of 15° to 60° C. is advisable during the precipitation process.

When using the rubber emulsions, a temperature that is in the vicinity of the boiling point of the rubber solvent is desirable during the precipitation, so that it can be removed by distillation.

Finally, the rubber containing filler is separated from the water of the precipitation suspension by a conventional separating technique (phase separation), and is dried with constant agitation, for example, in a fluidized bed dryer. The particle size distribution of the powdered material obtained is generally less than 10 mm, preferably ranging from 50 μm to 5 mm, and especially preferably ranging from 100 μm to 3 mm.

Vulcanizable complete rubber mixtures can be prepared in a simple manner from the powdered rubbers containing filler produced by this process, by admixing with the powdered rubber with conventional additives, such as additional fillers, plasticizer oils, resins, ozone-protective agents and stabilizers, as well as crosslinking chemicals. Mixing is performed in a modern fluid mixing device commonly used in thermoplastic technology, without applying shear forces to the material being mixed. The direct use of such powdered complete rubber mixtures in the final stage of conventional rubber processing with the exclusion of heavy mechanical mixers with high energy consumption is possible in turn, in a surprisingly simple and economical manner. Furthermore, the powdered complete mixtures obtained from the products of the invention can be injected directly into special extruders or automatic injection molding machines. The output that can be produced and the quality of the resulting products, such as tire treads and profiled caulking, correspond to the results when using solid rubbers by applying the conventional multistep, costly process technique.

Having generally described this invention, a further understanding can be obtained by reference to certain specific examples which are provided herein for purposes of illustration only and are not intended to be limiting unless otherwise specified.

If not otherwise indicated, percentage data are percentages by weight.

Abbreviations phr: Parts by weight per 100 parts by weight of rubber
ML(1+4): Mooney viscosity, measured according to the procedure of DIN 53 523

Test Procedures

Jenike Test for Flowability

The measured value specified in N/m² results from a shear test for the determination of the yield pressure of powdered products by the Jenike method in the so-called Flow factor Tester (A. W. Jenike, Aufbereitungs-Technik 1982, No. 8, 411–22). The test was carried out with the specified consolidating pressure at 50° C. and with 24 hours of storage time. In the range in which yield pressures were chosen, the powders are considered to have good flowability and good bin storage capability with values below 1000 N/m². In the range from 1000 to 2000 N/m², the flowability of the powders is still satisfactory and they can still be handled in a silo with delivery aids. In case of values above 2000 N/m², the flowability and silo storage capability of the powders are unsatisfactory. A consolidating pressure of 3700 N/m² was chosen in all examples.

Test screening as described in DIN 16 165: The powdered rubbers obtained in the examples were each divided into six fractions by screening. The screen meshes of fractions 1 to 6 were always 1000, 800, 500, 200, 100 and 50 μm, beginning with No. 1 having a screen mesh of 1000 μm.

Carbon black content was determined by the procedure of ASTM D 1506-59T.

Silica and other inorganic fillers were determined by ashing a sample at 1000° C. and optional treatment with hydrofluoric acid (HF).

Methods of Measurement pH determinations were made using a Metrohm pH Meter (Model E 520).

EXAMPLES 1 to 4

One liter of completely deionized water was placed in a 5-liter plane ground glass flask. A carbon black suspension consisting of 1097 g of water and 70 g of carbon black (Degussa CORAX N 339), dispersed in each case with a Janke & Kunkel ULTRA-TURRAX dispersing apparatus, was then added to the flask with stirring together with various amounts of aluminum sulfate in the form of a 20% solution. After brief mixing at a setting of 8 (mixer RW 20 of the Janke & Kunkel Co.), a mixture of 100 g of rubber (styrene-butadiene copolymer from Bunawerke Huls GmbH with an ML(1+4)=50) in the form of a 23.5% solids dispersion and 7.5 g of sodium water glass solution (solids content 26.5%–1.4 g $SiO_2$) was added and stirred for 1 minute. A homogeneous premix was obtained. pH values of 3.5 to 6.2 were produced by slow addition of 2 g of sulfuric acid (calculated as 100%) at the same stirring speed. The primary rubber grain precipitated out. After passing through the usual viscosity increase, the precipitation was completed within approximately 10 seconds after adding the acid. With further stirring, a suspension of 157 g of water and 10 g of the aforementioned carbon black was metered in. After mixing, the stirrer speed was dropped to a setting of 1, and the stirring was continued for 10 to 15 minutes longer. The stirrer was stopped, and the precipitated product was separated from the liquor on a filter and dried in a laboratory fluidized bed dryer to a residual water content of <1%.

The powdered material was screened and carbon black determinations were obtained as shown in Table 1. The table also shows the compressive strength values, the amounts of aluminum sulfate used, and the pH values of the precipitating suspensions.

TABLE 1

| Example | 1 | | 2 | | 3 | | 4 | |
|---|---|---|---|---|---|---|---|---|
| Aluminum sulfate g | 2.0 | | 1.5 | | 1.0 | | 0.5 | |
| pH | 3.5 | | 3.9 | | 4.1 | | 6.2 | |
| Compressive strength N/m² | 1320 | | 1410 | | 1400 | | 1580 | |
| Fraction No. | A | B | A | B | A | B | A | B |
| 1 | 6.0 | 74 | 12.5 | 78 | 25.1 | 77 | 30.1 | 79 |
| 2 | 4.0 | 74 | 17.5 | 78 | 15.0 | 78 | 20.0 | 78 |
| 3 | 30.0 | 78 | 30.0 | 77 | 25.0 | 79 | 38.0 | 78 |
| 4 | 41.0 | 78 | 30.0 | 78 | 19.0 | 79 | 17.1 | 78 |
| 5 | 18.0 | 82 | 7.5 | 79 | 4.5 | 78 | 3.9 | 77 |
| 6 | 1.0 | 87 | 2.5 | 80 | 1.4 | 79 | 0.9 | 77 |

A = screen residue %, B = carbon black content phr
The ash content and residual water content were <1% in each case.

EXAMPLE 5

The procedure of Example 3 was repeated except that no water glass was added to the rubber dispersion. The pH of the precipitated suspension was 4.3. The compressive strength of the powdered rubber obtained was 1630 N/m$^2$; the results of screening and carbon black determinations are shown in Table 2.

EXAMPLE 6

The procedure of Example 3 was repeated except that a carbon black suspension consisting of 2272 g of water and 145 g of carbon black was first used. A carbon black suspension of 1313 g of water and 20 g of carbon black was metered in later. The pH of the precipitated suspension was 3.8. The compressive strength of the powdered rubber obtained was 650 N/m$^2$; Table 2 shows the results of screening and carbon black determinations.

TABLE 2

| Fraction | Screen Residue % | | Carbon Black Content phr | |
|---|---|---|---|---|
| No. | Example 5 | Example 6 | Example 5 | Example 6 |
| 1 | 23.8 | 13.1 | 78 | 166 |
| 2 | 14.7 | 15.9 | 78 | 165 |
| 3 | 32.6 | 36.1 | 79 | 160 |
| 4 | 26.1 | 29.8 | 79 | 163 |
| 5 | 4.0 | 4.7 | 79 | 167 |
| 6 | 1.5 | 0.2 | 80 | 167 |

The ash and residual water contents were <1% in each case.

EXAMPLE 7

The Example 3 was repeated with the following differences: A 1.0 g amount of barium sulfate was used as the metal salt. The amount of sulfuric acid added was 3.0 g. The pH of the precipitated suspension was 5.1. The compressive strength of the powdered rubber obtained was 1640 N/m$^2$. Table 3 shows the results of screening and carbon black determinations.

EXAMPLE 8

The procedure employed was the same as described in Examples 1 to 4, but with the following differences. The amount of aluminum sulfate employed was 2.5 g and acetic acid (2 g) was used as the acid. The pH of the precipitation suspension was 4.0. The compressive strength of the powdered rubber obtained was 1780 N/m$^2$. Table 3 shows the results of screening and carbon black determinations.

TABLE 3

| Fraction | Screen Residue % | | Carbon Black Content phr | |
|---|---|---|---|---|
| No. | Example 7 | Example 8 | Example 7 | Example 8 |
| 1 | 95.2 | 27.7 | 77 | 78 |
| 2 | 2.6 | 19.7 | 78 | 79 |
| 3 | 1.7 | 34.9 | 78 | 79 |
| 4 | 0.3 | 17.4 | 78 | 80 |
| 5 | 0.1 | 0.1 | 79 | 80 |
| 6 | — | 0.1 | — | 81 |

The ash and residual water content in each case was <1%.

EXAMPLE 9

The procedure of Example 4 was repeated except that a total of 80 g of high-activity silica (Degussa VN 3) was used instead of a total of 80 g of carbon black (CORAX N 339). The pH of the precipitated suspension was 3.6. The compressive strength of the powdered rubber obtained was 1700 N/m$^2$. Table 4 shows the results of screening and filler determinations.

EXAMPLE 10

By the method and with the apparatus described in Examples 1 to 4, a high-filler powdered rubber was produced. A 250 g amount of carbon black (CORAX N 339) was used in the form of a 6% aqueous suspension, of which 90% was added initially and 10% was metered in later. A 27.2 g amount of styrene-butadiene rubber was used in the form of a 23.5% dispersion, and 2 phr of sulfuric acid and 0.15 phr aluminum sulfate were used in the process. Furthermore, 1.4 phr SiO$_2$ was used in the form of a water glass solution. The pH of the precipitated suspension was 8.6. The pH was lowered to 4.0 before the phase separation with sulfuric acid. The compressive strength of the powdered rubber obtained was 470 N/m$^2$. Table 4 shows the results of screening and filler determinations.

TABLE 4

| Fraction | Screen Residue % | | Carbon Black Content phr | |
|---|---|---|---|---|
| No. | Example 9 | Example 10 | Example 9 | Example 10 |
| 1 | 23.5 | 2.7 | 77 | 897 |
| 2 | 15.4 | 1.3 | 77 | 897 |
| 3 | 32.1 | 15.8 | 78 | 898 |
| 4 | 28.2 | 62.6 | 79 | 901 |
| 5 | 0.7 | 15.4 | 79 | 903 |
| 6 | 0.1 | 2.2 | 80 | 904 |

The ash and residual water content in each case was <1%.

Having now fully described the invention, it will be apparent to one of ordinary skill in the art that many changes and modifications can be made thereto without departing from the spirit or scope of the invention as set forth herein.

What is claimed as new and is desired to be secured by Letters Patent of the United States is:

1. A process for preparing a pourable powdered rubber containing filler, comprising:
    preparing a blend by mixing a portion of said filler to be incorporated in said rubber product with 0.1 to 6.5 phr of a water-soluble salt of a Group IIa, IIb, IIIa or VIII metal of the Periodic Table and a rubber latex or aqueous emulsion of a rubber solution;
    adjusting the pH of the blend to a pH ranging from 3.2 to 8.6 by addition of an acid;
    adding the remaining amount of filler to the pH adjusted blend;
    separating the rubber containing filler from the aqueous phase of the blend; and
    drying the powdered rubber product obtained.

2. The process of claim 1, wherein said blend contains a solvent, and said solvent is removed from said blend after the pH of the blend has been adjusted.

3. The process of claim 1, wherein at least 50 wt. % of the filler is incorporated in said blend initially at the blend's formulation.

4. The process of claim 1, wherein said metal salt is magnesium chloride, zinc sulfate, aluminum chloride, aluminum sulfate, ferric chloride, ferric sulfate, cobalt nitrate or nickel sulfate.

5. The process of claim 4, wherein said salt is aluminum sulfate.

6. The process of claim 1, wherein said blend contains an alkali metal silicate.

7. The process of claim 6, wherein said blend contains up to 5 parts by weight of silica, as an alkali metal silicate, per 100 parts by weight of rubber.

8. The process of claim 1, wherein the pH of the blend is decreased to 2.5 prior to separating the rubber from the aqueous phase.

9. The process of claim 1, wherein the pH of the blend is decreased to 2.5 prior to separating the rubber from the aqueous phase when preparing powdered rubbers which have a filler ratio $\geq 100$ phr.

10. The process of claim 1, wherein said rubber is a homopolymer of a conjugated diene selected from the group consisting of 1,3-butadiene, isoprene, piperylene, 2-chloro-1,3-butadiene, 2,3-dichloro-1,3-butadiene and 2,3-dimethyl-1,3-butadiene.

11. The process of claim 1, wherein said rubber is a copolymer formed from a combination of at least two conjugated dienes or is a copolymer of at least one conjugated diene with styrene, α-methylstyrene, acrylonitrile, acrylic acid, methacrylic acid or vinylpyridine.

12. The process of claim 1, wherein said powdered rubber product obtained has a particle distribution of less than 10 mm.

13. The process of claim 12, wherein said particle size distribution ranges from 50 μm to 5mm.

* * * * *